United States Patent
Nakazato

(10) Patent No.: US 7,178,043 B2
(45) Date of Patent: Feb. 13, 2007

(54) POWER CONSUMPTION CONTROL METHOD AND INFORMATION PROCESSING DEVICE

(75) Inventor: Takahiro Nakazato, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 549 days.

(21) Appl. No.: 10/405,724

(22) Filed: Apr. 2, 2003

(65) Prior Publication Data

US 2003/0188210 A1 Oct. 2, 2003

(30) Foreign Application Priority Data

Apr. 2, 2002 (JP) ............................. 2002-100462

(51) Int. Cl.
*G06F 1/26* (2006.01)

(52) U.S. Cl. ..................... 713/300; 713/320; 713/322; 713/323; 455/127.1; 455/127.5; 455/343.5; 700/297

(58) Field of Classification Search ............... 713/300, 713/320, 322, 323; 455/127.1, 127.5, 343.5; 700/297

See application file for complete search history.

(56) References Cited

U.S. PATENT DOCUMENTS

| | | | | |
|---|---|---|---|---|
| 6,100,666 | A * | 8/2000 | Ryu | 320/132 |
| 6,169,387 | B1 * | 1/2001 | Kaib | 320/132 |
| 6,327,665 | B1 * | 12/2001 | Osanai | 713/324 |
| 6,367,023 | B2 * | 4/2002 | Kling et al. | 713/340 |
| 6,415,388 | B1 * | 7/2002 | Browning et al. | 713/322 |
| 6,489,834 | B2 * | 12/2002 | Naffziger et al. | 327/534 |
| 6,513,124 | B1 * | 1/2003 | Furuichi et al. | 713/322 |
| 6,574,740 | B1 * | 6/2003 | Odaohhara et al. | 713/323 |
| 6,684,341 | B1 * | 1/2004 | Malcolm et al. | 713/320 |
| 6,845,456 | B1 * | 1/2005 | Menezes et al. | 713/320 |
| 6,925,573 | B2 * | 8/2005 | Bodas | 713/320 |
| 6,952,782 | B2 * | 10/2005 | Staiger | 713/300 |
| 2001/0044909 | A1 * | 11/2001 | Oh et al. | 713/600 |
| 2002/0099962 | A1 * | 7/2002 | Nakamura | 713/300 |
| 2002/0108070 | A1 * | 8/2002 | Oh | 713/600 |

FOREIGN PATENT DOCUMENTS

| | | |
|---|---|---|
| JP | 9-251334 | 9/1997 |
| WO | WO 00/26747 | 5/2000 |

* cited by examiner

*Primary Examiner*—A. Elamin
*Assistant Examiner*—Nitin C. Patel
(74) *Attorney, Agent, or Firm*—Pillsbury Winthrop Shaw Pittman LLP

(57) ABSTRACT

A controller reads a current value from a current sensor at regular intervals and calculates the average power consumption (Pavg) for a specified length of time (T). When the average power consumption (Pavg) exceeds an upper value (Pu) of power consumption, the controller performs throttling control of a CPU at a throttling rate of r %. If, nevertheless, the average power consumption (Pavg) is above the upper value (Pu), the controller sequentially increases the throttling rate in steps of r %. When the average power consumption (Pavg) is reduced below a lower value (Pl) as a result of the throttling control, the controller sequentially decreases the throttling rate in steps of r % until the upper value (Pu) is reached.

13 Claims, 7 Drawing Sheets

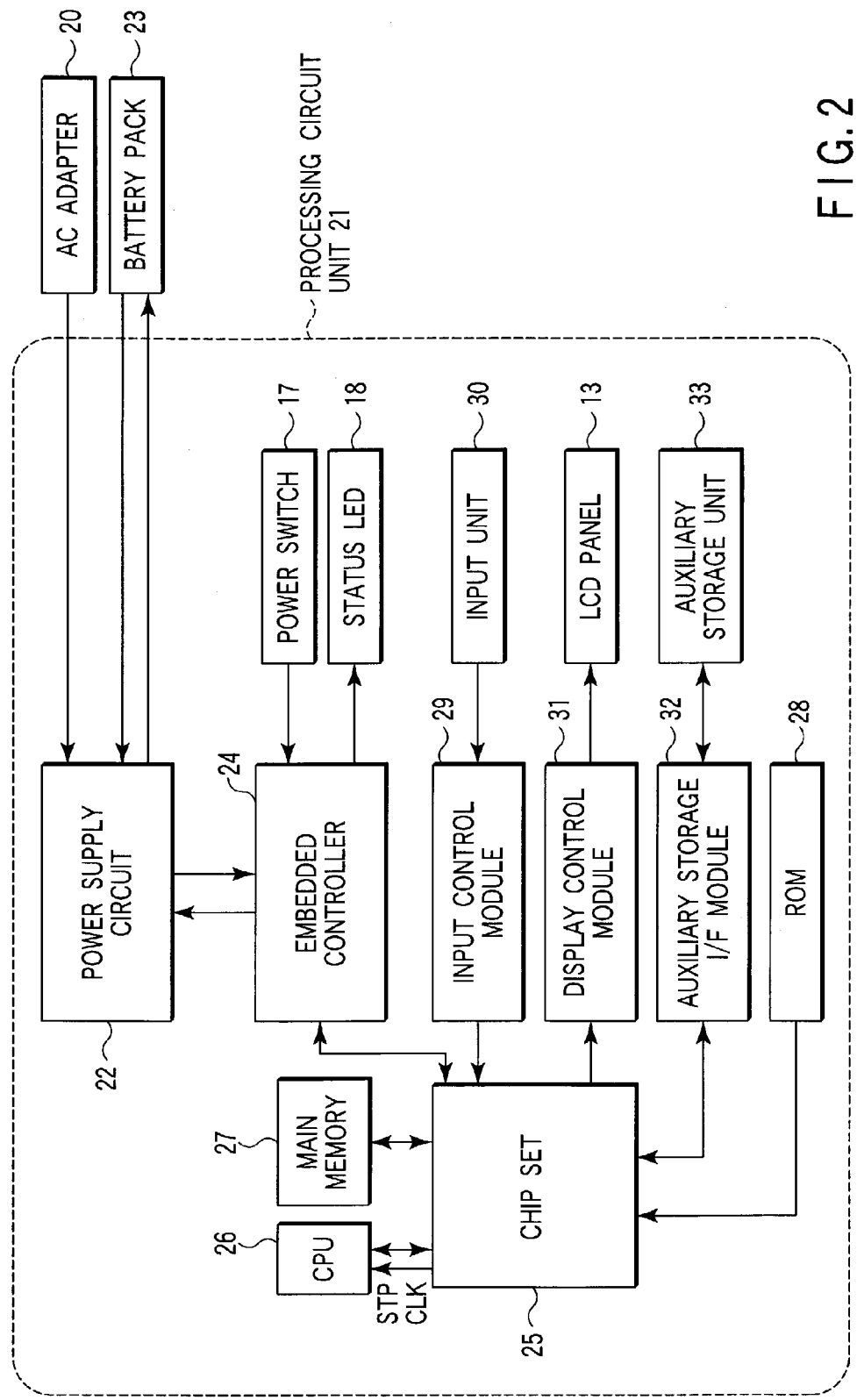
F I G. 2

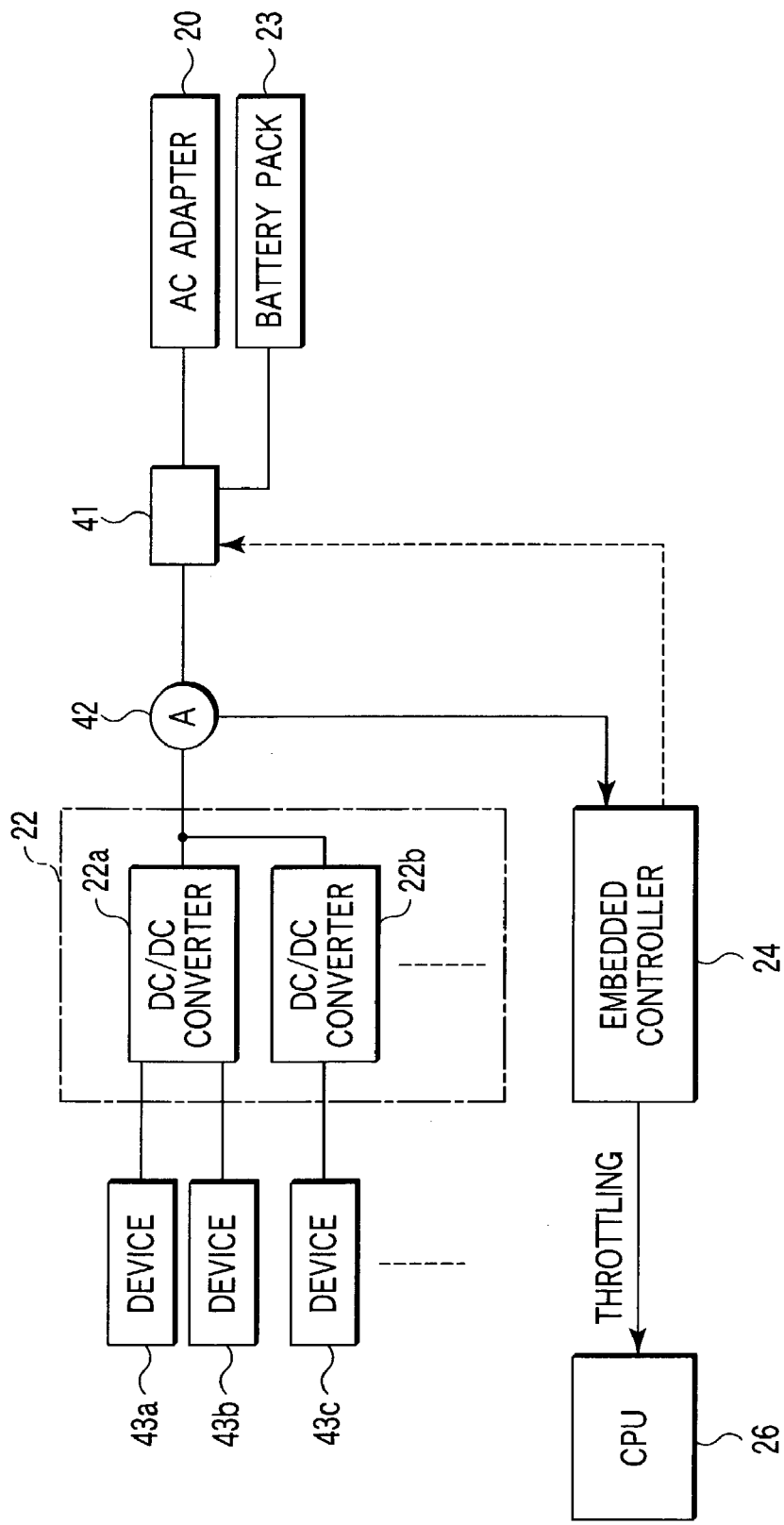
F I G. 3

POWER CONSUMPTION CONTROL METHOD AND INFORMATION PROCESSING DEVICE

CROSS-REFERENCE TO RELATED APPLICATIONS

This application is based upon and claims the benefit of priority from prior Japanese Patent Application No. 2002-100462, filed Apr. 2, 2002.

BACKGROUND OF THE INVENTION

1. Field of the Invention

The present invention relates to a power consumption control method and an information processing device that reduce the power consumption of a system.

2. Description of the Related Art

Conventionally, in information processors, in particular notebook personal computers, a maximum power consumption of the system as a whole is generally estimated during system design. An AC adapter or battery pack is used that has a power capacity that allows for the estimated maximum power consumption. Likewise, in desktop personal computers as well, the maximum power consumption of the system as a whole is estimated during system design and the AC adapter is used that has a power capacity that allows for the estimated maximum power consumption.

Conventionally, as a typical technique to control the power consumption of personal computers, a technique to control the average power consumption of the CPU by interrupting the CPU clock signal periodically (hereinafter referred to as the throttling control) is known. This throttling control is mainly used to control unwanted heat in the CPU or to prolong the battery operating time.

With recent general personal computers, however, the power consumption has been increasing as the processing power of CPUs increases. For this reason, an AC adapter/battery pack of higher capacity will be required, which may result in problems of increased cost, increased size, and elevated temperature of the case surface.

BRIEF SUMMARY OF THE INVENTION

It is an object of the present invention to provide a power consumption control method and an information processor that permit the system power consumption to be reduced with certainty and an AC adapter or battery pack of low power capacity to be used.

According to an aspect of the present invention, there is provided a power consumption control method that calculates an average power consumption on the basis of the power consumption of a system including a CPU; and reduces the power consumption of the CPU when the average power consumption exceeds a specified value.

According to another aspect of the present invention, there is provided an information processing device having: a CPU; and a controller that calculates an average power consumption of a system and controls to reduce power consumed by the CPU when the average power consumption exceeds a predetermined value.

BRIEF DESCRIPTION OF THE SEVERAL VIEWS OF DRAWING

FIG. 2 is a block diagram of a main circuit of the personal computer according to the first embodiment;

FIG. 3 is a block diagram of the major portion of the personal computer of FIG. 1 including the CPU and the embedded controller according to the first embodiment;

DETAILED DESCRIPTION OF THE INVENTION

Embodiments of the present invention will be described hereinafter with reference to the accompanying drawings.

[First Embodiment]

Figure 1:
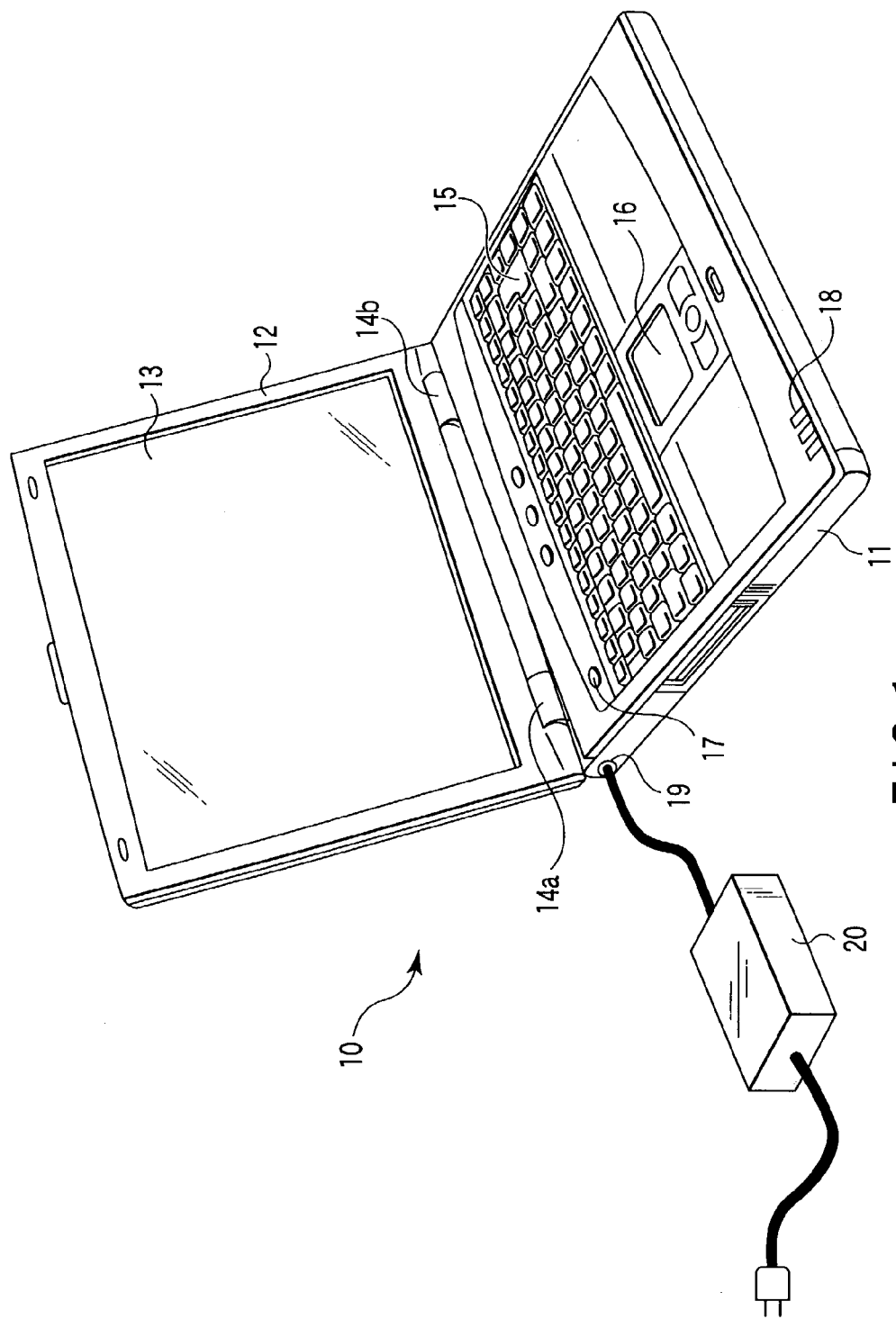
FIG. 1 is a perspective view of a personal computer according to a first embodiment of the present invention with a cover of the personal computer open.

FIG. 1 is a perspective view of a notebook personal computer. In FIG. 1, the personal computer 10 comprises a case body 11 and a lid 12. The lid 12 houses an LCD (liquid crystal display) panel 13 as an example of a display device. The lid 12 is held so that the lid 12 can be flipped over with hinges 14a and 14b at the rear edge of the case body 11.

The case body 11 is provided on top with a keyboard (KB) 15, a touch pad 16, a power switch 17, a status display LED 18, etc. Also, the case body is provided with a jack 19 on its left side, into which a plug connected to an AC adapter 20 is inserted. The AC adapter 20 converts an externally applied AC (alternating current) voltage into a DC (direct current) voltage for application to the computer. Further, circuit boards, a battery pack and so on are housed in the case body 11.

FIG. 2 is a block diagram of the personal computer 10.

In FIG. 2, a processing circuit unit 21 is provided with a power supply circuit 22, to which an AC adapter 20 and a battery pack 23 are connected. The AC adapter 20 and the battery pack 23 provide power to the processing circuit unit 21 and peripheral circuits. The battery pack 23 is provided interchangeably. The battery pack 23 is adapted to store power when the AC adapter provides power to the processing circuit unit 21 and to provide power to the processing circuit unit 21 when the AC adapter is not connected to the external power supply. This power switching is performed by an embedded controller 24 to be described later. The battery pack 23 has a built-in microcomputer, which, when the battery pack 23 provides power to the system, reads in values of voltage and current being supplied to the system.

To the power supply circuit 22 is connected the embedded controller 24 to which the power switch 17, the LED 18, and a chip set (Chipset) 25 are connected. To the chip set 25 are connected a CPU 26, a main memory (RAM) 27 and a ROM 28.

The embedded controller 24 monitors the amount of current of the system and provides a stop clock signal (STPCLK) to the CPU 26 via the chip set 25 to thereby perform throttling control of the CPU 26, which will be described later in detail. In addition, the embedded controller 24 performs power supply state monitoring, power supply switching control, charge/discharge control of the battery pack 23, control of the power switch 17 and the status display LED 18, etc.

The chip set 25, which is an LSI having functions necessary for the computer basic system built in, interconnects the CPU 26, the main memory 27 and an extension bus to control the flow of data. The CPU 26 controls the whole system. The main memory 27 can be read from and written into by the CPU 26. The main memory 27 temporarily retains necessary data associated with control operation of the CPU 26. The ROM 28 stores a BIOS (Basic Input/Output System).

To the chip set 25 are connected an input control module 29, a display control module 31, and an auxiliary storage I/F module 32.

The input control module 29 controls input devices 30, such as the keyboard 15, the touch pad 16, a mouse, etc.

The display control module 31 controls a display device such as the LCD panel 13.

The auxiliary storage I/F module 32 controls an auxiliary storage device, such as a hard disk drive.

The power consumption control operation by the embedded controller 24 will be described hereinafter.

FIG. 3 is a block diagram of the major portion associated with the power consumption control operation. In FIG. 3, a power supply switch 41 selects either the AC adapter 20 or the battery pack 23 according to a control command from the embedded controller 24 to provide power to the power supply circuit 22 via a current sensor 42. When the external power supply is provided via the AC adapter 20 to the system, the embedded controller 24 provides power output from the AC adapter 20 to the power supply circuit 22 and stores power in the battery pack 23. If, on the other hand, the AC adapter 20 is not connected to the external power supply, the embedded controller 24 provides power output from the battery pack 23 to the power supply circuit 22.

The power supply circuit 22 comprises a plurality of DC/DC converters 22a, 22b, etc. The DC/DC converters are connected to devices 43a, 43b, etc. Each of the DC/DC converters 22a, 22b, etc. in the power supply circuit 22 converts a DC voltage from the AC adapter 20 or the battery pack 23 to a different voltage and provides the output voltage to a corresponding device or devices.

The current sensor 42 detects a current that is applied to the system and then outputs the current value (I) to the embedded controller 24. The embedded controller 24 reads the current value (I) detected by the current sensor 42 and then calculates the power consumption of the system and the average power consumption (Pavg) for a predetermined length of time (T) on the basis of the current value (I) and the voltage value of the power supply. The embedded controller 24 then makes a comparison between the average power consumption (Pavg) and a reference value for throttling control of the CPU 26.

The throttling is a function of changing the average processing speed of the CPU 26 by causing the CPU 26 to operate/stop intermittently at regular intervals. This throttling may also be referred to as the interval stop clock function or the intermittent operation function.

In the state where the throttling is disabled, i.e., the state where the CPU 26 is operating at all times, the maximum level of performance of the CPU 26 is achieved. In the state where the throttling is enabled at a rate of some percentage (referred to as the throttling rate), the maximum level of performance of the CPU 26 is not achieved. The throttling rate is defined as the ratio of the stopped state (stop time) to the operating state (operating time). Changing the throttling rate allows multistep control of the CPU's performance. In the present embodiment, the state where the CPU 26 is operating at all times is defined as the default state. Therefore, the CPU 26 will operate at the maximum level of performance until the throttling control is commenced. Switching control between the operating and the stopped state of the CPU 26 can be performed through the use of a stop clock signal (STPCLK). The stop clock signal is a clock state control signal supported by processors, such as a 486SL, Pentium, etc., manufactured by Intel.

As an example, suppose that T=60 seconds, Pu=80 W, Pl=60 W and r=12.5% where T is a specified time and Pu and Pl are predetermined upper and lower limiting values, respectively, of power consumption, and r is the throttling rate. Then, the embedded controller 24 will perform the following control operation:

The embedded controller 24 reads the current value detected by the current sensor 42 at regular intervals, e.g., every 0.1 seconds, and calculates the power value from that current value and the voltage value of the power supply. The embedded controller 24 then calculates the average power consumption (Pavg) for the specified length of time (T), i.e., the past 60 seconds. If the average power consumption (Pavg) becomes 80 W (upper limiting value Pu) or more, the embedded controller 24 performs the throttling control at a rate of 12.5%. When the average power consumption (Pavg) exceeds 80 W irrespective of this throttling control, the embedded controller 24 sequentially increases the throttling rate in units of 12.5%: 12.5%, 25%, 37.5% and so on. Increasing the throttling rate is continued until the average power consumption (Pavg) is reduced to less than 60 W.

When the average power consumption (Pavg) is reduced below 60 W under the throttling control, the embedded controller 24 sequentially decreases the throttling rate in units of 12.5%. Decreasing the throttling rate is continued until it becomes zero or until the average power consumption (Pavg) exceeds 80 W.

Figure 4:
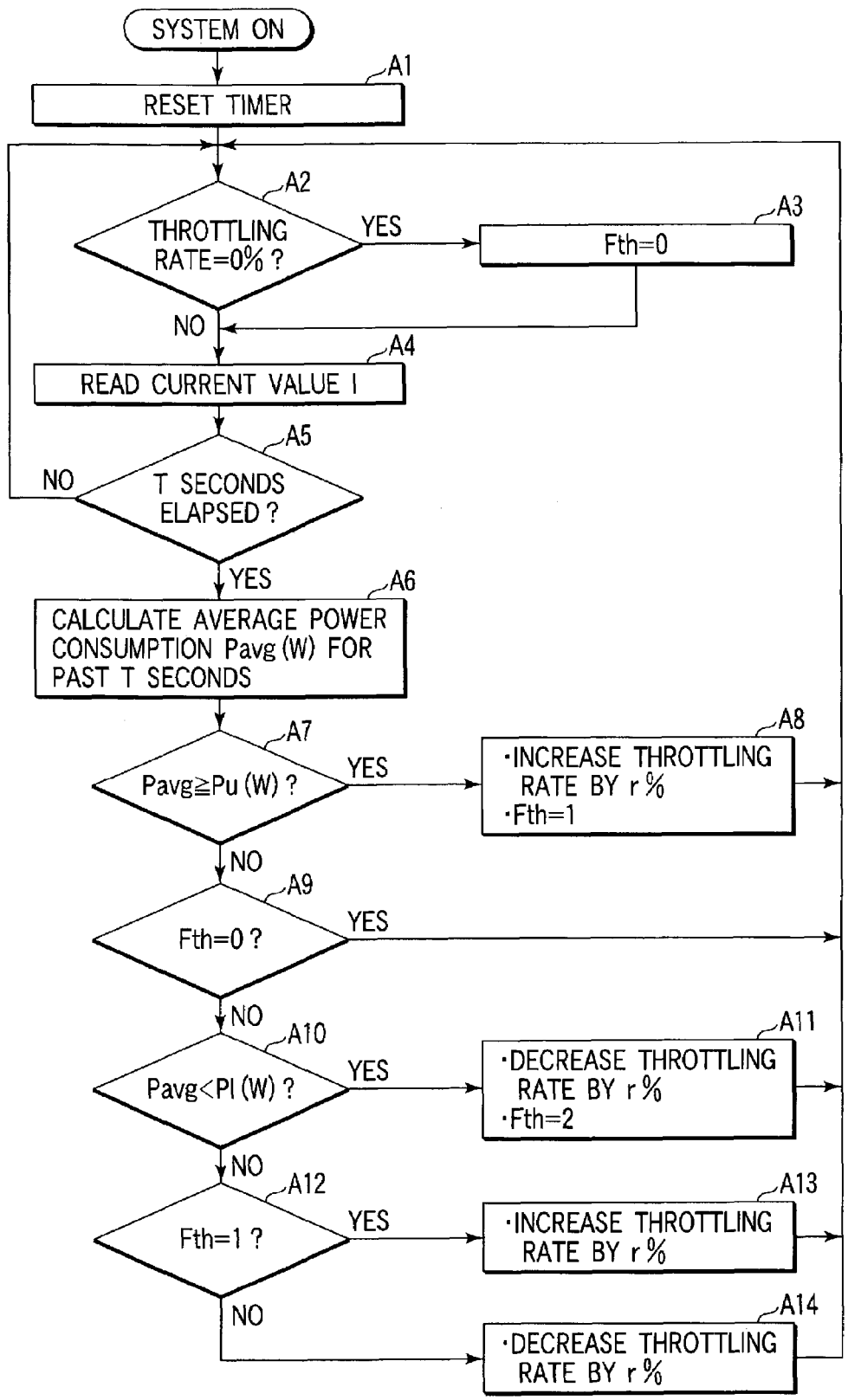
FIG. 4 is a flowchart of the process of controlling the system power consumption according to the first embodiment.

The throttling control of the CPU 26 by the embedded controller 24 will be described in more detail with reference to a flowchart shown in FIG. 4.

When the power switch 17 is operated to start up the system, the embedded controller 24 resets the timer (step A1). The embedded controller 24 then determines whether the throttling rate is zero, that is, whether the throttling control is not performed (step A2). If the throttling rate is zero, the throttling status flag Fth is set to zero (step A3). The throttling status flag Fth being one (Fth=1) indicates that the throttling rate r is increasing and Fth=2 indicates that the throttling rate r is decreasing.

When the determination in step A2 is that the throttling rate r is zero and hence the throttling status flag Fth has been set to 0 in step A3, the embedded controller 24 reads the current value (I) from the current sensor 42 to calculate the power value for the current value (I) on the basis of the current value (I) and the voltage value of the power supply and store it into a memory (step A4). The reading of the current value from the current sensor 42 is performed, say, every 0.1 seconds.

Subsequent to step A4, the embedded controller 24 determines whether the specified length of time (T), for example, 60 seconds, have elapsed (step A5). If the determination is that the specified length of time (T) has not elapsed, the procedure returns to step A2; thus, the process is repeated beginning with step A2. If the determination in step A5 is that the specified length of time (T) has elapsed, then the embedded controller 24 calculates the average power consumption (Pavg) for the past T seconds from the power values stored in the memory (step A6). A determination is then made as to whether or not the average power consumption is the upper limiting value (Pu) or more (step A7). If the average power consumption is the upper limiting value (Pu) or more, the embedded controller 24 increases the throttling rate by, say, 12.5% and sets the throttling status flag Fth to one (indicating that the throttling rate is being increased) (step A8). Subsequent to step A8, the procedure returns to step A2 and the process is repeated.

If, on the other hand, the decision in step A7 is that the average power consumption (Pavg) is less than the upper limiting value (Pu), then the embedded controller 24 makes a decision of whether the throttling status flag Fth is zero, i.e., whether the throttling control is not performed (step A9). If Fth=0, the procedure returns to step A2.

If the determination in step A9 is that the throttling stage flag Fth is not zero, then the embedded controller 24 determines whether the average power consumption (Pavg) is lower than the lower limiting value (Pl) (step A10). If the determination is that the average power consumption (Pavg) is lower than the lower limiting value (Pl), then the embedded controller 24 determines that the current throttling rate is too high and consequently decreases the throttling rate by r % (=12.5%) and sets the throttling status flag Fth to two (indicating that the throttling rate is being decreased) (step A11). Subsequent to step A11, the procedure returns to step A2 and the process is repeated.

If the decision in step A10 is that the average power consumption (Pavg) is not less than the lower limiting value (Pl), then the embedded controller 24 makes a decision of whether the throttling status flag Fth is one (step A12). If Fth=1, the embedded controller 24 further increases the throttling rate by r % (step A13). That is, if the average power consumption (Pavg) is not reduced below the lower limiting value (Pl) under the throttling control, the embedded controller 24 further increases the throttling rate by r % in step A13 and then repeats the process beginning with step A2.

That, in step A12, the throttling status flag Fth is not one indicates that the throttling rate is being decreased and the average power consumption (Pavg) is less than the upper limiting value (Pu). Thus, the embedded controller 24 further decreases the throttling rate by r % (step A14) and then repeats the process beginning with step A2.

As described above, the embedded controller 24 reads the current value of the system at regular intervals and calculates the average power consumption (Pavg) for a specified length of time. When the average power consumption (Pavg) exceeds the upper limiting value (Pu) of a predetermined range, the embedded controller 24 increases the throttling rate (r) step by step. When the average power consumption (Pavg) goes lower than the lower limiting value (Pl) of the predetermined range, the embedded controller 24 decreases the throttling rate (r) step by step, thereby controlling the power consumption of the system.

Thus, in the event that the system is subjected to a heavy load that does not meet the specifications of the AC adapter 20 and the battery pack 23, the system power consumption control method of the present embodiment allows the power consumption of the system to be controlled with certainty to within a predetermined range. It becomes therefore possible to use an AC battery and a battery pack which are of lower capacity.

In the above embodiment, each of the upper and lower limiting values (Pu) and (Pl) of the range of control by the embedded controller 24 is set to the same value for the AC adapter 20 and the battery pack 23; however, this is not restrictive. The upper and lower limiting values (Pu) and (Pl) may be set independently for each of the AC adapter 20 and the battery pack 23. For example, since the battery pack 23 is limited in operating time, the upper and lower limiting values (Pu) and (Pl) when the battery pack is used may be set so that its power consumption is reduced in comparison with that of the AC adapter 20.

Although the above embodiment is configured such that the embedded controller 24 reads the system current detected by the current sensor 42 for throttling control of the CPU 26, this is not restrictive. For example, a microcomputer incorporated into the battery pack 23 may read the voltage and current values to the system for the throttling control. In this case, the embedded controller 24 receives the voltage and current values read by that microcomputer via a data bus and then calculates the average power consumption for a predetermined length of time. The average power consumption is then compared with the upper and lower limiting values (Pu) and (Pl) of a control range for throttling control of the CPU 26. In this case as well, the power consumption of the system can be reduced.

[Second Embodiment]

Figure 5:
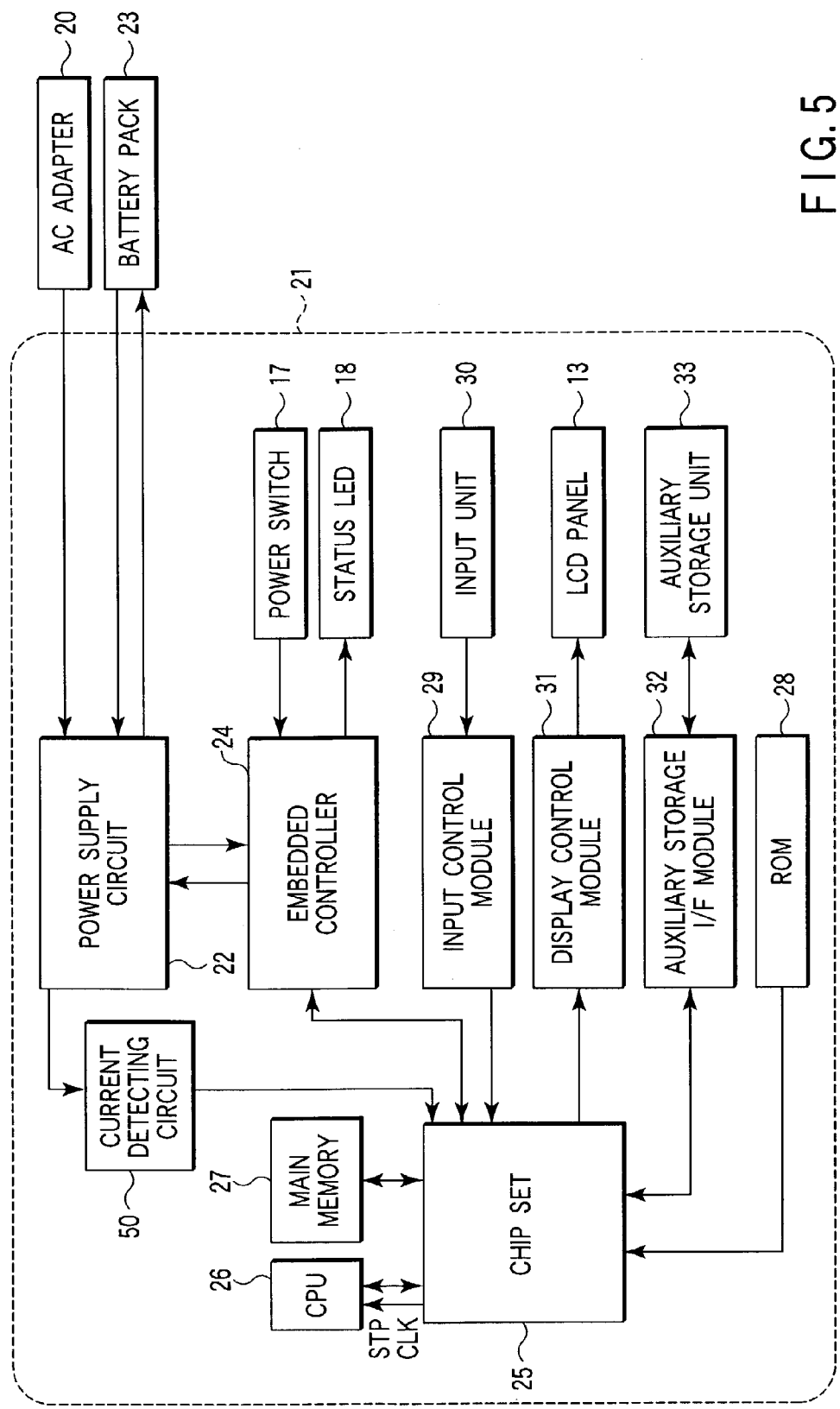
FIG. 5 is a block diagram of a main circuit of the personal computer according to a second embodiment of the present invention.

A second embodiment of the present invention will be described next with reference to FIG. 5, which illustrates, in block diagram form, a personal computer according to the second embodiment of the present invention.

In the first embodiment, the embedded controller 24 is used for throttling control of the CPU 26. In the second embodiment, unlike the first embodiment, a current detecting circuit 50 is placed to detect a system-consumed current in the power supply circuit 22 and the on-off control of throttling of the CPU 26 is effected by that current detecting circuit 50 according to the system current. The configuration of FIG. 5 is the same as that of the first embodiment shown in FIG. 2 except for the arrangement of the current sensor 50. In FIG. 5, therefore, components corresponding to those in FIG. 2 are denoted by like reference numerals and detailed descriptions thereof are omitted.

Figure 6:
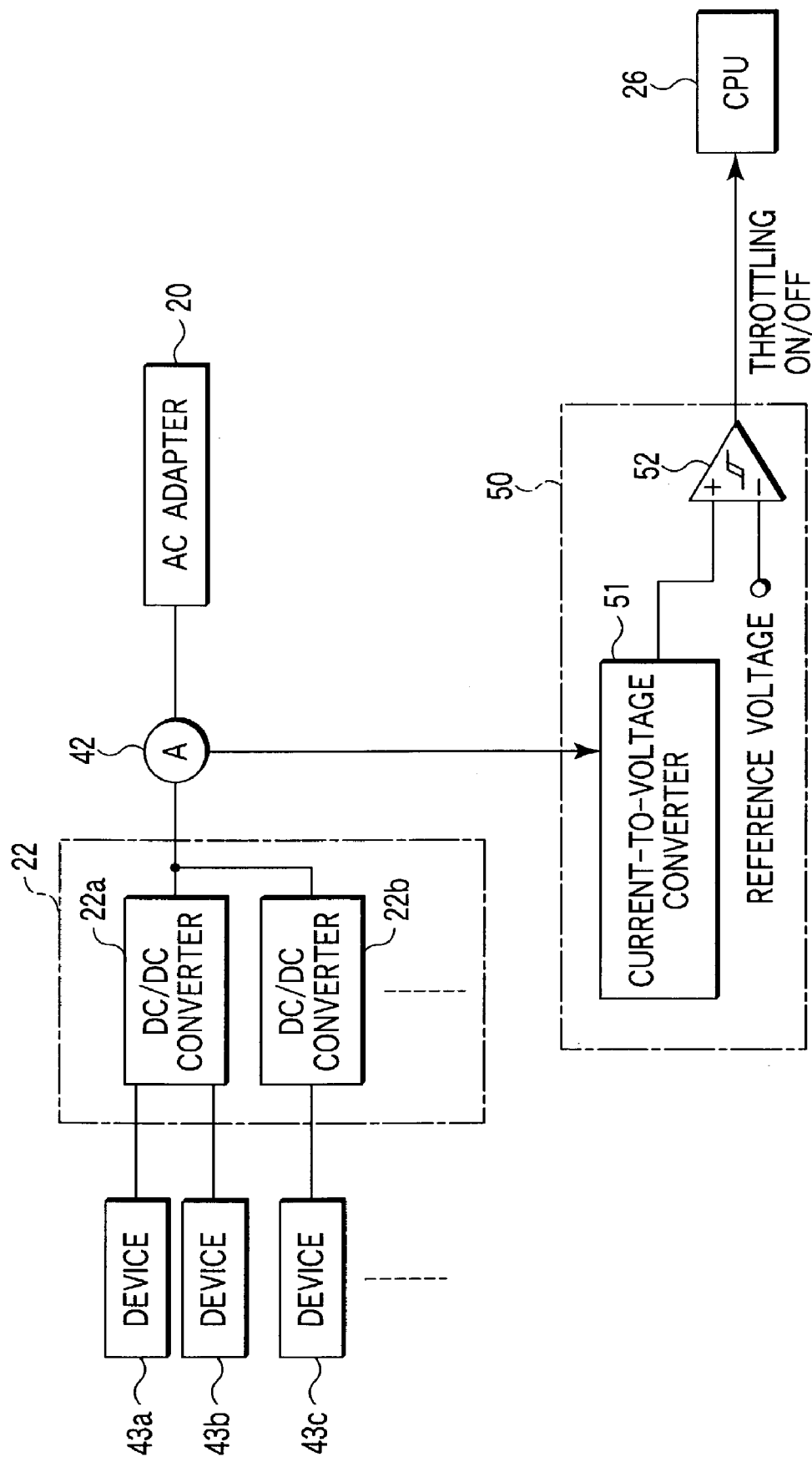
FIG. 6 is a block diagram of the major portion of the personal computer of FIG. 5 including the CPU and the embedded controller according to the second embodiment.

The current detecting circuit 50 is constructed, as shown in FIG. 6, from a current-to-voltage converter 51 and a comparator 52. The current-to-voltage converter 51 converts a system current value detected by the current sensor 42 into a corresponding voltage value. The comparator 52 compares the output voltage value of the current-to-voltage converter 51 with a reference voltage value to provide an ON/OFF signal (H/L) for throttling of the CPU 26.

The reference voltage value is previously set so as to allow the comparator 52 to output a throttling ON signal at a high level when the system power consumption is equal to or higher than the upper limiting value (Pu) and a throttling OFF signal at a low level when the system power consumption is equal to or lower than the lower limiting value (Pl). The reference voltage value is allowed to be a fixed value.

In the above configuration, the comparator 52 outputs the throttling ON signal when the output voltage value of the current-to-voltage converter 51 becomes equal to or higher than the reference voltage value. Thereby, the CPU 26 is subjected to throttling control at a specified rate. As a result of this throttling control, the system power consumption is reduced. When the output voltage value of the current-to-voltage converter 51 becomes equal to or lower than the reference voltage value, the comparator 52 outputs the throttling OFF signal (L). Thereby, the throttling control of the CPU 26 is switched OFF.

In the second embodiment, the current detecting circuit 50 is allowed to perform throttling control of the CPU 26, eliminating the need for the embedded controller 24 to perform throttling control of the CPU 26. In the configuration of FIG. 5, therefore, the embedded controller 24 can be omitted, allowing the configuration of the control circuit to be simplified and the cost to be reduced.

The method of controlling system power consumption on the basis of throttling control of the CPU 26 using the current detecting circuit 50 can be applied not only to a notebook personal computer but also to a desktop personal computer.

[Third Embodiment]

A third embodiment of the present invention will be described next. The third embodiment is directed to a configuration such that, when the notebook personal computer shown in FIGS. 1 and 2 is battery-powered, the user is allowed to set a battery operating time. In this case, the user can specify the battery operating time set mode through the input device 30.

Figure 7:
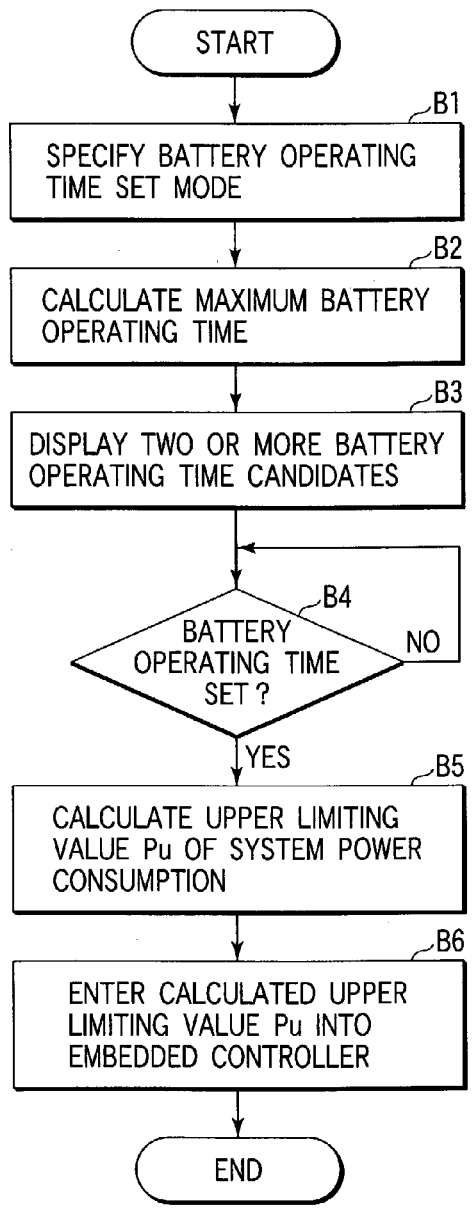
FIG. 7 is a flowchart illustrating the processing operation when a user sets a battery operating time in accordance with a third embodiment of the present invention.

FIG. 7 is a flowchart for the process when the user sets a battery operating time. When the user specifies the battery operating time set mode through the input device 30 (step B1), the CPU 26 checks a residual power of the battery pack 23 through the embedded controller 24 and then calculates a maximum battery operating time under conditions of throttling control (step B2).

The CPU 26 sets or reads out from a database two or more candidates for the battery operating time within the range of the maximum battery operating time and displays them on the display screen so that the user can make a selection (step B3). The CPU 26 is placed in the wait state until the user specifies a candidate for the battery operating time (step B4). When a battery operating time candidate is specified by the user, the CPU 26 calculates the upper limiting value (Pu) of system power consumption that allows for the specified battery operating time (step B5). The CPU 26 then enters the calculated upper limiting value (Pu) of system power consumption into the embedded controller 24 (step B6). Thereby, the battery operating time setting process is completed.

Figure 8:
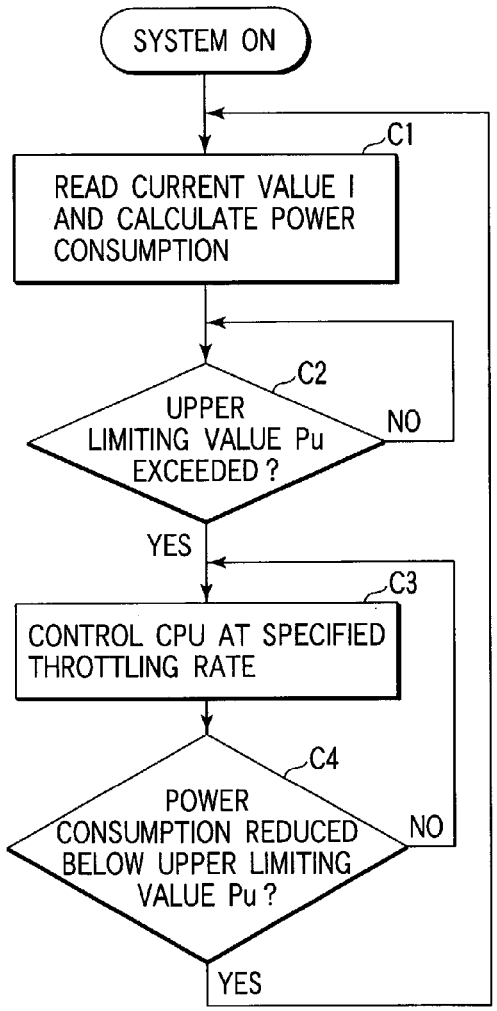
FIG. 8 is a flowchart of the throttling control operation by the embedded controller in the third embodiment.

After the battery operating time has been set by the process shown in FIG. 7, the embedded controller 24 carries out throttling control. An exemplary throttling control procedure is illustrated in FIG. 8. First, the embedded controller 24 reads the system-consumed current value (I) at regular intervals from the current sensor 42 to calculate the power consumption of the system from the current value (I) and the voltage value of the power supply (step C1). A determination is next made as to whether or not the system power consumption has exceeded the upper limiting value (Pu) (step C2). If the upper limiting value (Pu) is not exceeded, no throttling control of the CPU 26 is performed.

If the determination in step C2 is that the upper limiting value (Pu) has been exceeded by the system power consumption, then the embedded controller 24 carries out throttling control on the CPU 26 at a predetermined throttling rate (step C3). After that, the embedded controller 24 determines whether or not the system power consumption has reduced below the upper limiting value (Pu) (step C4). If the result of the determination indicates that the system power consumption has not reduced below the upper limiting value (Pu), the procedure returns to step C3 to repeat the throttling control.

If the decision in step C4 is that the system power consumption has reduced below the upper limiting value (Pu), the procedure returns to step C1 and the above process is repeated.

As described above, a determination is made at regular intervals as to whether or not the upper limiting value (Pu) has been exceeded by the system power consumption. When the system power consumption exceeds the upper limiting value (Pu), throttling control is performed on the CPU 26. It therefore becomes possible to reduce the system power consumption and meet the user-specified battery operating time.

Although the third embodiment has been described as performing throttling control on the CPU 26 at a set throttling rate, this implementation is not restrictive. The throttling rate may be changed step by step as in the first embodiment.

Although the third embodiment has been described as displaying battery operating time candidates so that the user can make a selection, this is not restrictive. For example, a range within which the battery operating time can be set may be displayed so that the user can set any battery operating time within that range.

Although the third embodiment has been described in terms of a notebook personal computer, this is not restrictive. The third embodiment can also be applied to any other battery-powered portable information equipment.

According to the present invention, as described above in detail, the system power consumption can be reduced with certainty below a set value even in the event that the system is subjected to a heavy load that does not meet the specifications of the AC adapter/battery pack used, and hence an AC adapter/battery pack of lower capacity can be used.

What is claimed is:

1. A power consumption control method comprising:
supplying operating power to a system including a central processing unit (CPU) from a battery pack including a microcomputer;
reading, via a data bus, by the microcomputer in the battery pack, a voltage value or a current value that is applied to the system;
calculating an average power consumption based on the voltage value or the current value;
increasing a throttling rate of the CPU in steps until the average power consumption of the system reaches a lower value when the average power consumption exceeds an upper value; and
decreasing the throttling rate of the CPU in steps until the average power consumption of the system reaches the upper value when the average power consumption of the system is reduced below the lower value.

2. The power consumption control method according to claim 1, wherein
reducing the power consumption of the CPU includes increasing a throttling rate of the CPU in steps until the average power consumption of the system reaches a lower value of a predetermined range when the average power consumption of the system exceeds an upper value of the predetermined range, and
decreasing the throttling rate of the CPU in steps until the average power consumption of the system reaches the upper value when the average power consumption of the system is reduced below the lower value of the predetermined range.

3. The power consumption control method according to claim 1, wherein the system is operated by power from either of an AC adapter and the battery pack, and a specified value is set to a different value for each of the AC adapter and the battery pack.

4. The power consumption control method according to claim 1, further including converting the current value that is applied to the system into the voltage value, and switching ON and OFF throttling control of the CPU using the voltage value.

5. The power consumption control method according to claim 1, wherein the operating power is provided from the battery pack, and the upper value is calculated based on a operating time of the battery pack.

6. The power consumption control method according to claim 5, wherein the operating time is a time specified by user.

7. The power consumption control method according to claim 1, wherein the upper value and the lower value are changed in accordance with a kind of a power supply which provides the operating power to the system.

8. An information processing device comprising:
  a central processing unit (CPU);
  a battery pack that has a microcomputer built in and provides power to a system, the microcomputer in the battery pack reading a voltage value or a current value that is applied to the information processing device;
  a first controller that receives the current value from the system and utilizes the current value to calculate the average power consumption of the system; and
  a second controller that increases a throttling rate of the CPU in steps until the average power consumption of the system reaches a lower value when the average power consumption exceeds a an upper value, and decreases the throttling rate of the CPU in steps until the average power consumption of the system reaches an upper value when the average power consumption of the system is reduced below the lower value.

9. The information processing device according to claim 8, further including: a control unit that controls the second controller so as to output a clock state control signal to switch the CPU between an operating state and a stopped state.

10. The information processing device according to claim 8, further including:
  a sensor that detects the current value applied to the system;
  a converter that converts the current value detected by the sensor into the voltage value; and
  a third controller that switches ON and OFF throttling control for the CPU using the voltage converted by the converter.

11. The information processing device according to claim 8, further including:
  a setting unit that sets an operating time of the battery pack; and
  a calculating unit that calculates the upper value based on the operating time.

12. The information processing device according to claim 11, further including a specifying unit for a user to specify the operating time.

13. The information processing device according to claim 8, further including a setting unit that changes the upper value and lower value in accordance with a kind of power supply which provides an operating power to the system.

* * * * *